United States Patent
Martone et al.

(10) Patent No.: US 7,296,840 B2
(45) Date of Patent: Nov. 20, 2007

(54) FLOOR LATCH MECHANISM

(76) Inventors: Michael A. Martone, 4793 Orchard Ridge, Troy, MI (US) 48098; Tyrone R. Secord, 2450 Somerset Blvd., Apt. 202, Troy, MI (US) 48084

(*) Notice: Subject to any disclaimer, the term of this patent is extended or adjusted under 35 U.S.C. 154(b) by 69 days.

(21) Appl. No.: 11/112,644

(22) Filed: Apr. 22, 2005

(65) Prior Publication Data

US 2005/0236862 A1    Oct. 27, 2005

Related U.S. Application Data

(60) Provisional application No. 60/564,373, filed on Apr. 22, 2004.

(51) Int. Cl.
*B60N 2/02* (2006.01)

(52) U.S. Cl. .................. 296/65.03; 248/503.1

(58) Field of Classification Search ............... 296/63, 296/65.1, 65.03; 248/503.1, 503; 297/336, 297/335
See application file for complete search history.

(56) References Cited

U.S. PATENT DOCUMENTS

| | | |
|---|---|---|
| 4,484,776 A | 11/1984 | Gokimoto et al. |
| 4,606,577 A | 8/1986 | Hirama et al. |
| 4,695,094 A | 9/1987 | Siebler |
| 4,759,580 A | 7/1988 | Berklich, Jr. et al. |
| 4,770,459 A | 9/1988 | Nakaiwa et al. |
| 4,838,588 A | 6/1989 | Hayakawa et al. |
| 4,925,229 A | 5/1990 | Siebler |
| 4,971,379 A * | 11/1990 | Rumpel et al. ............... 296/63 |
| 5,022,698 A | 6/1991 | Butt et al. |
| 5,238,285 A | 8/1993 | Holdampf et al. |
| 5,330,245 A | 7/1994 | Boisset |
| 5,383,699 A | 1/1995 | Woziekonski et al. |
| 5,393,116 A | 2/1995 | Bolsworth et al. |
| 5,498,040 A | 3/1996 | Silye |
| 5,562,322 A | 10/1996 | Christoffel |
| 5,941,591 A | 8/1999 | Tsuge et al. |
| 6,152,515 A * | 11/2000 | Wieclawski ............... 296/65.03 |
| 6,290,297 B1 | 9/2001 | Yu |
| 6,412,849 B1 | 7/2002 | Fast |
| 6,698,837 B2 | 3/2004 | Pejathaya et al. |
| 6,820,912 B1 * | 11/2004 | Lavoie ................. 296/65.03 |
| 6,908,137 B2 * | 6/2005 | Doxey et al. .......... 296/65.16 |
| 6,945,585 B1 * | 9/2005 | Liu et al. .............. 296/65.03 |
| 2003/0132656 A1 * | 7/2003 | Thiel ................... 297/361.1 |
| 2004/0217618 A1 * | 11/2004 | LaVoie ................. 296/65.03 |
| 2005/0218685 A1 * | 10/2005 | Liu et al. .............. 296/65.03 |

* cited by examiner

*Primary Examiner*—Lori L. Lyjak
(74) *Attorney, Agent, or Firm*—Rader, Fishman & Grauer PLLC

(57) ABSTRACT

A floor latch assembly includes a mounting bracket secured to the seat cushion of an automotive seat. A latch hook is pivotally connected to a side wall of the mounting bracket and engages a striker pin on the floor of a vehicle. A cam lock hook is pivotally connected to the mounting bracket and engages the latch hook to create a locking mechanism for securing the seat to the striker pin. An anti-separation member maintains alignment of the latch hook and the cam lock hook to enhance the locking mechanism.

27 Claims, 3 Drawing Sheets

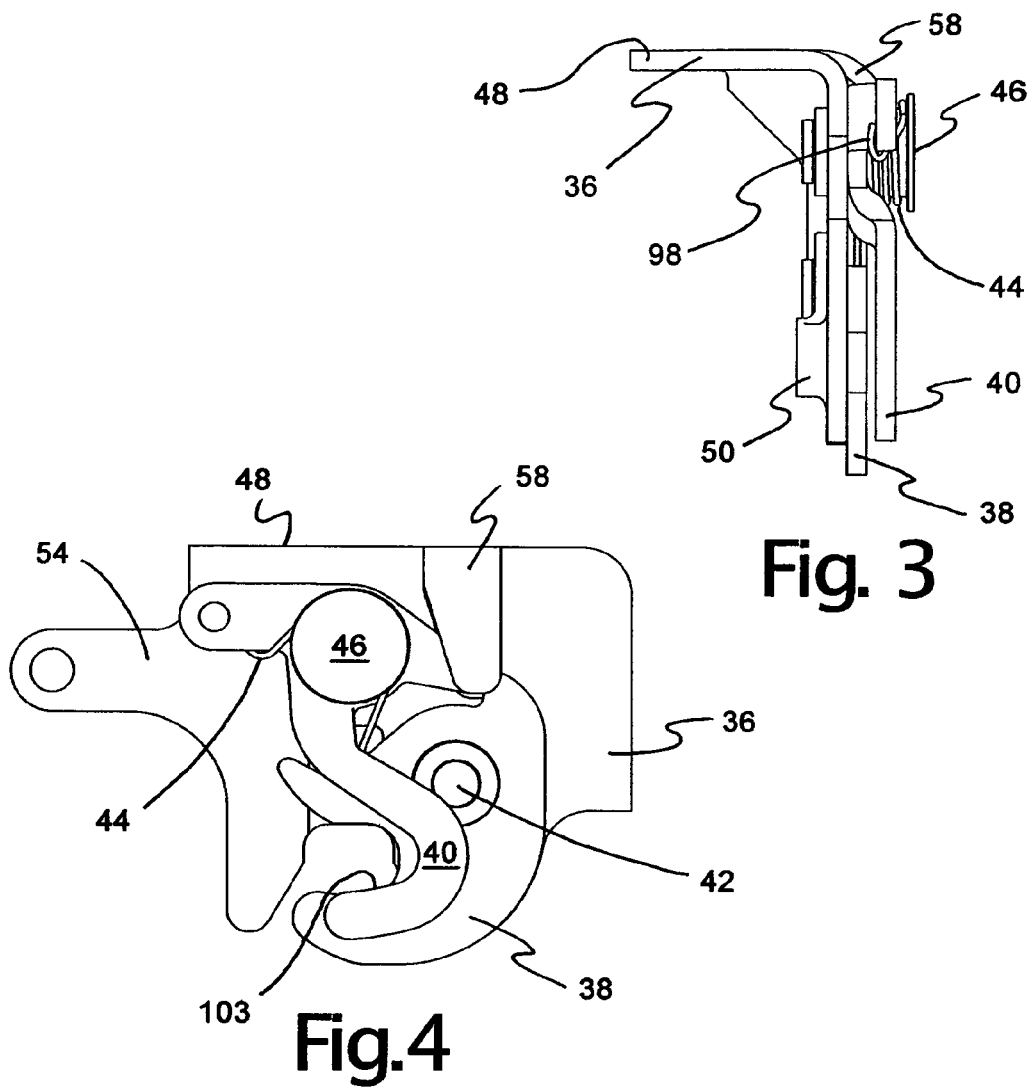
Fig. 3
Fig. 4
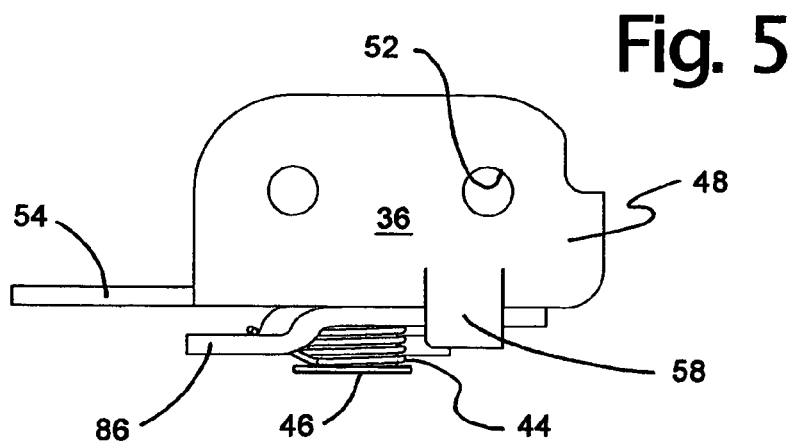
Fig. 5

FLOOR LATCH MECHANISM

CROSS-REFERENCE TO RELATED APPLICATION

This application claims the benefit of U.S. Provisional Application No. 60/564,373, filed 22 Apr. 2004. The disclosure of the above application is incorporated herein by reference.

FIELD OF THE INVENTION

The present invention relates to a floor latch mechanism for securing a seat to the floor of a vehicle and, more particularly, to an improved latch mechanism for releasably connecting a seat to the floor of the vehicle.

BACKGROUND AND SUMMARY OF THE INVENTION

Automotive floor latch seat mechanisms are well known in the industry and they employ a variety of designs. These mechanisms connect the lower portion of an automotive seat to the floor of the vehicle. Early mechanisms permanently mounted the seat to the floor of the vehicle, thus, making it impossible for the occupant to move, adjust, or even remove the seat. However, the automotive market has evolved to provide greater flexibility and seat maneuverability.

It has been desirable to improve upon conventional seat mechanisms so as to allow the seat to move for a variety of purposes. For example, it is beneficial to allow a second row seat to move up and out of the way so as to allow an occupant to access a third row of seats in the rear of the vehicle. It has also been desirable to provide releasable floor latch mechanisms so as to allow the seat to be entirely removed from the vehicle. This adds increased cargo space in the interior of the vehicle.

Traditional adjustable floor latch mechanisms are complicated and they often utilize numerous interworking components so as to accomplish the desired releasing feature. These prior art mechanisms often require complex assemblies utilizing multiple specially stamped parts and springs that have a tendency to fail. While some of these floor latch mechanism assemblies have been successful, they have increasing problems of reliability, are expensive due to their complex design, and add weight to the vehicle.

Therefore, it is desirable to provide an improved floor latch mechanism assembly that minimizes the number of components and hence, cost of the assembly. It is also desirable to provide an assembly that weighs less. It is further desirable to provide an improved floor latch mechanism assembly that has an improved locking mechanism for securing the seat to the floor. Further, it is desirable to provide an improved floor latch mechanism assembly that is easier for the operator to operate. It also is desirable to provide a latch assembly that is universal in its design so as to be utilized in other applications where it is desirable to latch a component.

To accomplish these and other objects, the present invention provides a floor latch mechanism assembly for removably securing a seat to a floor of a vehicle. The assembly includes a mounting bracket having an upper flange that is mountable to the underside of a seat, with a side flange extending at a right angle from the upper flange. A latch hook is disposed adjacent to the mounting bracket, and is pivotally connected to the mounting bracket by a first pivot pin. A cam lock hook is provided that interfaces with the latch hook and they work in concert with one another so as to provide a locking feature with the striking pin that is secured to the floor of the vehicle. A second pivot pin extends through the cam lock hook and is in turn staked to the mounting bracket. A spring is positioned between the second pivot pin and the cam lock hook so as to engage the cam lock hook to the latch hook. An anti-separation device maintains the cam lock hook and the latch hook in alignment so as to add integrity to the locking feature.

Further areas of applicability of the present invention will become apparent from the detailed description provided herein. It should be understood that the detailed description and specific examples, while indicating preferred embodiments of the present invention, are intended for purposes of illustration only, since various changes and modifications within the spirit and scope of the invention will become apparent to those skilled in the art from this detailed description. It will be appreciated that the present invention can be utilized in automotive, airplane, train, and any other application where it is desirable to releasably connect a component.

BRIEF DESCRIPTION OF THE DRAWINGS

The present invention will become more fully understood from the detailed description and the accompanying drawings, wherein:

FIG. 3 is a front view of the floor latch mechanism assembly

FIG. 4 is a side view of the floor latch mechanism assembly taken in the direction of arrow number 4 as shown in FIG. 2;

FIG. 5 is a top view of the floor latch mechanism assembly;

DETAILED DESCRIPTION OF THE PREFERRED EMBODIMENTS

Those skilled in the art can now appreciate from the foregoing description that the broad teachings of the present invention can be implemented in a variety of forms. Therefore, while this invention has been described in connection with particular examples thereof, the true scope of the invention should not be so limited, since other modifications will become apparent to the skilled practitioner upon a study of the drawings, specification and following claims. For illustrative purposes only, the present invention is shown in the context of an automotive seat.

Figure 1:
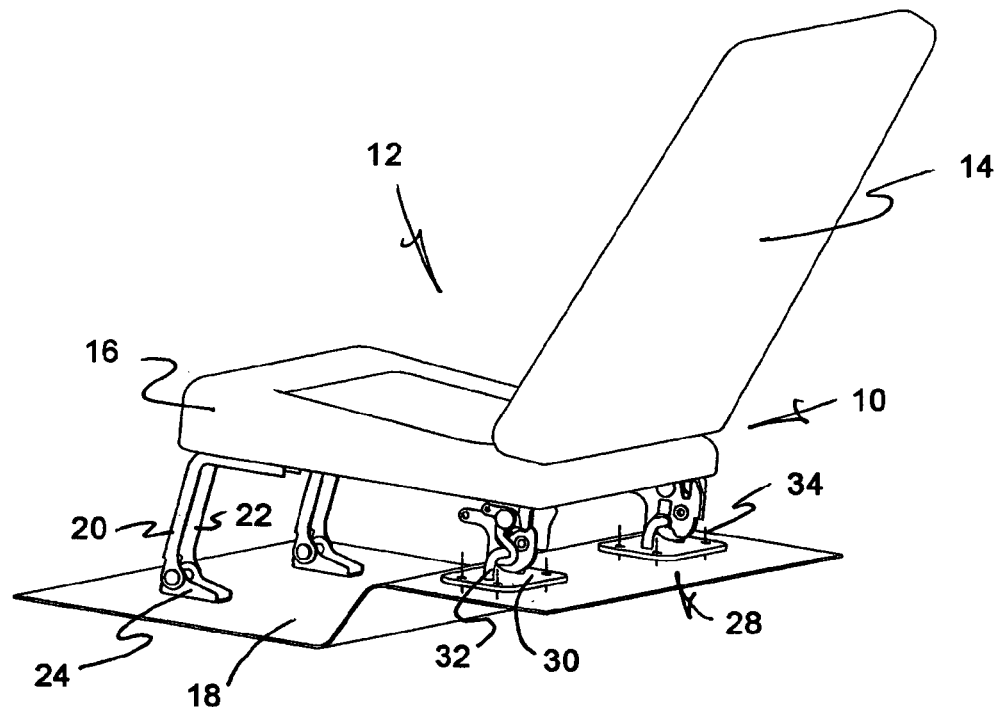
FIG. 1 is perspective view of an automotive seat depicting the present floor latch mechanism assembly invention.

Referring now to FIG. 1, floor latch mechanism assembly 10 is shown relative to an automotive seat 12. The seat has an upper portion 14 and seat cushion 16 that are secured to the floor 18 by a front leg assembly 20 and the floor latch mechanism 10. The front leg assembly 20 has an upper member 22 and base bracket 24 that are pivotally connected so as to allow the seat to adjust forward once the floor latch mechanism assembly 10 is disengaged.

The floor latch mechanism assembly 10 is secured to the underside of the seat cushion 16 by fasteners 26. The lower portion of the floor latch mechanism assembly 10 is connected to a striker plate assembly 28 which is comprised of a plate 30, a striker bar 32, and fasteners 34 for engaging the floor 18. The floor 18 is shown in an offset arrangement however it will be appreciated that a flat configuration could be utilized as well. It will be appreciated that the assembly 10 can be integral with the seat 12 so as to minimize the number of components in the assembly.

Figure 2:
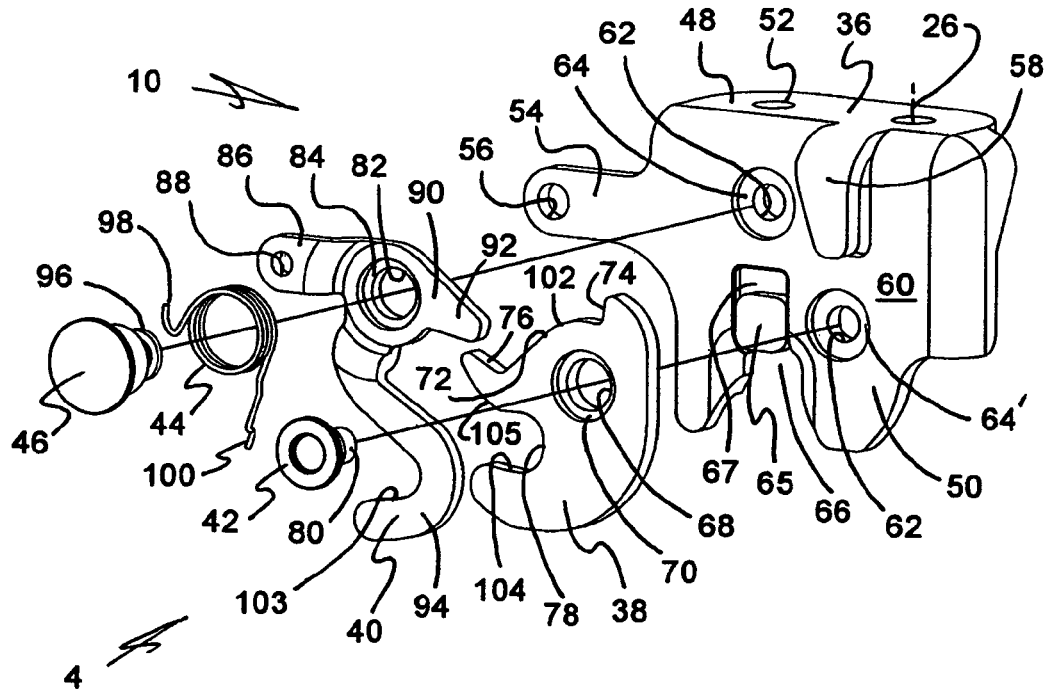
FIG. 2 is an exploded view of the floor latch mechanism assembly, depicting its interworking components.

With reference to FIG. 2, this exploded view shows the floor latch mechanism assembly 10 comprised of a mounting bracket 36, a latch hook 38, a cam lock hook 40, a pivot pin 42, a cam lock hook spring 44, and a cam lock hook pivot pin 46. The mounting bracket 36, latch hook 38 and cam lock hook 40 are preferably made of stamped steel of the type used in commercial applications.

The mounting bracket 36 includes an upper flange 48 and a side flange extending approximately perpendicular to the upper flange. It will be appreciated that the bracket 36 could be integral with the seat 12. The upper flange has a pair of mounting holes 52 that receive fasteners 26 for securing the mounting bracket to the underside of the seat cushion 16. During the stamping process a tab 54 is formed extending outwardly from a forward edge of the side flange 50 and a release cable attachment hole 56 is located therethrough and provides a mounting means for the release cable to be secured thereto. It will be appreciated that the release cable 104 can be secured to the mounting bracket 36 at other locations as long as it affords the desired travel to the latch hook 40. During the stamping process an anti-separation device or guide 58 is formed and is offset from the normal surface 60 that forms the side flange. The guide 58 is offset a sufficient distance so as to allow clearance for the width of latch hook 38 to be guided therein. The guide 58 maintains alignment of the latch hook 38 and the cam lock hook 40. This prevents axial separation when under load and assures the integrity of the lock feature. The anti-separation device could be a separate component that is attached to the bracket 36. A pair of holes 62 are pierced through the side flange 50 and they each have an emboss 64 and 64' for receiving their own pivot pin. A corresponding emboss 70 of the latch hook 38 mates with emboss 64' so as to sustain transfer of force between the mounting bracket 36 and latch hook 38. The configuration between these embosses maintains greater load capacity at their connection. A recess 66 is located at a lower end of the side flange 50 and is operable to receive the striker bar 32. A cut out 67 provides clearance for the spring 44. An anti-rattle insulator 65 can be inserted within cut out 67. The purpose of which is to minimize noise generated between the striker and the mounting bracket.

The latch hook 38 has an offset hole 68 extending thereto with a boss 70 for receiving the pivot pin 42. The upper portion of the latch hook 38 has a notched area 72 with a first shoulder 74 and a second shoulder 76. A striker pin recess area 78 is enlarged to receive the striker bar 32. The pivot pin 42 extends through the hole 68 of the latch hook 38 and then into the pivot hole 62. An end 80 of the pivot pin 42 is then deformed so as to pivotally secure the latch hook to the mounting bracket 36. The latch hook 38 yet is sufficiently loose fit to allow it to freely pivot and to be guided within guide 58.

With reference to FIGS. 2, 3, 5, and 6, the lock hook 40 has an anti-rattle component and a locking cam component and a release cable component. The cam lock hook 40 is unitary piece with an offset configuration so as to receive the spring 44. The cam lock hook 40 has an offset hole 82 with an emboss 84. Emboss 84 mates with emboss 64 to sustain the transfer of force between the mounting bracket 36 and the cam lock hook 40. The embosses can be of a flat configuration as illustrated or conic shaped. A means for receiving an actuating device is provided. This includes a first arm 86 or cable component which is offset from the hole 82 and the outer end of the first arm 86 has a release cable "attachment" hole 88. Opposing the first arm 86 is a second arm 90 a locking cam component that is operable to engage the recess 72 that is located in the latch hook 38. When the floor latch mechanism assembly 10 is in its secured position whereby the seat 12 is locked in place, the forward edge 92 of the second arm engages shoulder 74 whereby they are locked in place because of the force exerted by spring 44.

The cam lock hook 40 further includes a J-shaped hook member 94 or anti-rattle component that extends downwardly from hole 82 and is in surrounding engagement with the striker bar 32. The surface 103 of the hook member 94 contacts the bottom side of the striker 32. The center point of the radius of surface 103 is offset from the center point of hole 82. This creates a tapered relationship as the hook contacts the striker and provides a tight fit to the striker in the event of either positional variation of the striker or diameter size variation of the striker. This prevents any clearance between the latch 38 and the striker that would result in a loose fit that could generate a rattle. The cam lock hook 40 serves the dual purpose of a locking device for securing the latch 38 and to engage the striker.

The hook member 94 is further designed in a fashion utilizing the applied steel grade, steel gage and design cross-section to allow for controlled deformation in this area of the part. This controlled variation allows the striker to contact the latch hook 38 to increase the applied force capacity at this interface. Prior to the deformation of the cam lock hook 40, there is designed clearance between the striker and the latch hook 38. The controlled deformation also creates additional force in the clockwise rotation of the cam lock hook 40 to maintain engagement of edge 92 and shoulder 74.

The cam lock hook pivot pin 46 extends through the spring 44, through the hole 82 of the cam lock hook and then through the hole 62 of the mounting bracket. The end 96 of the pivot pin 46 is deformed against the backside of the flange 50 so as to cause locking engagement thereto. However, the pivot pin 46 allows the cam lock hook 40 to freely rotate relative to the mounting bracket 36.

The cam lock hook spring 44 is centered on the pivot pin 46 and at one end 98, it wraps around the first arm 86 of the cam lock hook, and at the opposite end 100, the spring impinges upon the recess surface 102 of the latch hook 38. The spring 44 is a conventional torsional tempered spring, but could be other spring types as long as they provide the necessary required spring force.

Figure 6:
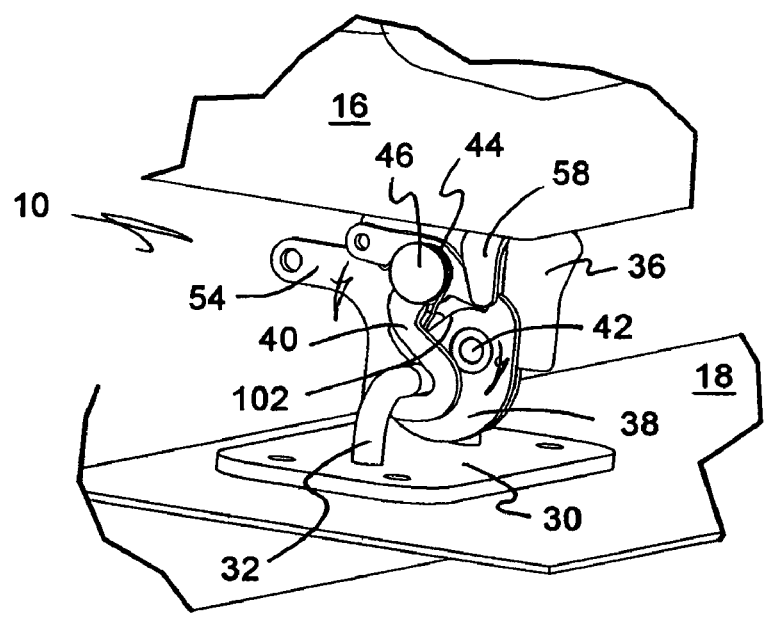
FIG. 6 is a partial perspective view of the floor latch mechanism assembly shown in its locked position.
Figure 7:
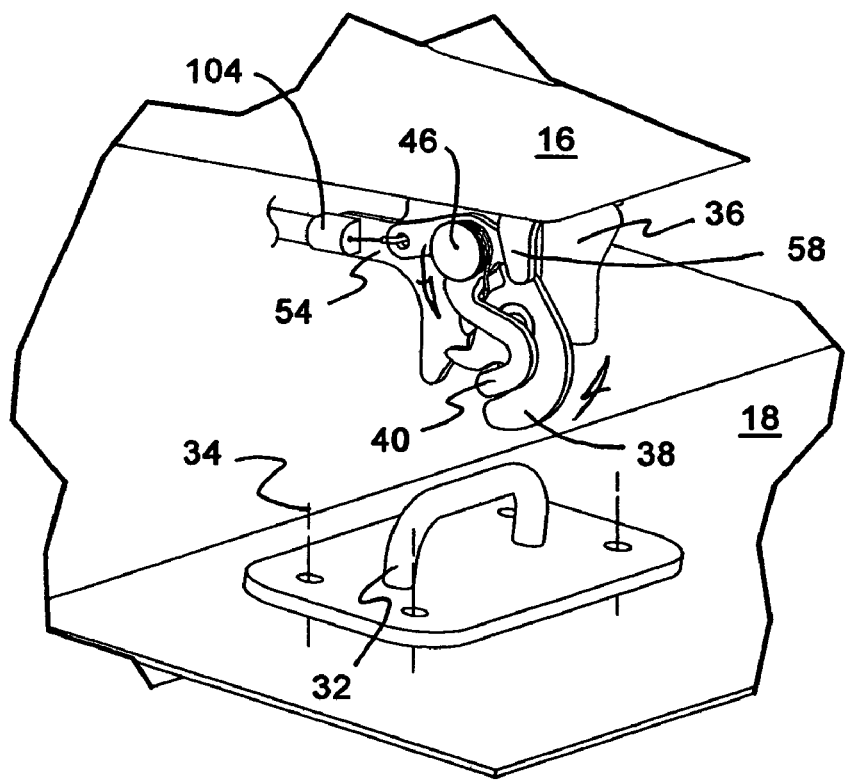
FIG. 7 is a partial perspective view of the floor latch mechanism assembly, shown in the disengaged position.

The operation of the present invention will now be presented. With reference to FIGS. 6 and 7, the assembly 10 is shown in an engaged and a disengaged position. FIG. 6 illustrates the assembly in its latched position whereby the latch hook 38 and the cam lock hook 40 are secured to the striker pin 32. It will be appreciated that a single striker pin could be used that extends the entire width of the seat, thus, alleviating the need for two separate strike assemblies 28. In the engaged position, the mounting bracket 36 is positioned so that striker pin is within recess 66. The latch hook 38 simultaneously makes contact with the striker pin 32, causing the latch hook 38 to rotate in a clockwise direction where the recess 78 fully engages the striker pin. As the latch hook 38 rotates clockwise, the second arm 90 of the cam lock hook 40 rotates clockwise once shoulder 74 has cleared edge 92 of the cam lock hook 40. The applied force from spring 44 automatically rotates the cam lock hook clockwise so as to allow the hook 94 to fully engage the striker pin 32. Once this occurs, a locking mechanism is created between the latch hook 38, the cam lock hook 40, and the guide 58 which holds the two later parts from moving axially. The guide prevents the latch hook 38 and the cam lock hook 40 from separating when under load. Collectively, this locking means maintains the seat in its locked position, until the release cable is pulled.

With reference to FIG. 7, the method of disengaging the assembly will now be presented. To disengage the floor latch assembly 10 from the striker pin 32, the operator pulls the release cable 104, thus causing the cam lock hook 40 to rotate counter-clockwise. This causes second arm 90 to shift upward within the guide 58 and to disengage from recess 72. The torsional force applied by spring 44 against the latch hook 38 then causes the latch hook 38 to rotate counter-clockwise so as to allow full disengagement of recess 78 from the striker pin 32. The seat 12 can now be moved upward and away from the floor.

Once the operator releases cable 104, the latch assembly 10 will remain in a disengaged state. Re-engagement of the striker 32 to the latch mechanism 10 is facilitated by the striker contacting the latch hook 40 along the trim surface 105 causing the latch hook to rotate clockwise into a locked relationship with the cam lock hook between arm 92 and shoulder 74.

The description of the invention is merely exemplary in nature and, thus, variations that do not depart from the invention are intended to be within the scope of the invention. Such variations are not to be regarded as a departure from the spirit and scope of the invention.

What is claimed is:

1. A latch mechanism for securing a seat to the floor of a vehicle, comprising:
    a mounting bracket having an upper portion and another portion, one of said portions being mountable to a seat;
    a latch hook disposed adjacent the mounting bracket, said latch hook is pivotally connected to the mounting bracket;
    a first pivot pin extending though the latch hook and the mounting bracket;
    a one-piece cam lock hook having an anti-rattle hook and a locking cam, the locking cam interfacing with the latch hook;
    a second pivot pin extending through the cam lock hook and is secured to the mounting bracket; and
    a spring positioned between the latch hook and the cam lock hook.

2. The latch mechanism as claimed in claim 1, further comprising an anti-separation device positioned adjacent to the latch hook.

3. The latch mechanism as claimed in claim 1, wherein the mounting bracket includes an outwardly extending member with an aperture in said outwardly extending member.

4. The latch mechanism as claimed in claim 1, wherein the mounting bracket includes a recess for receiving a striker.

5. The latch mechanism as claimed in claim 1, wherein the latch hook includes a notched portion, an aperture with a boss, and a recess for receiving a striker.

6. The latch mechanism as claimed in claim 1, wherein the latch hook includes a recessed portion that is operable to receive an outwardly extending member of the cam lock hook.

7. The latch mechanism as claimed in claim 1, wherein the cam lock hook includes a hooked shaped portion that is operable to engage a striker pin, and an arm that engages the latch hook.

8. The latch mechanism as claimed in claim 1, wherein the cam lock hook includes an outwardly extending member with a means for receiving a spring.

9. The latch mechanism as claimed in claim 1, wherein the latch hook includes a recess, and the cam lock hook includes an arm, the arm being pivotal so as to disengage the recess and allow the latch hook rotate to a disengaged position.

10. The latch mechanism as claimed in claim 1, wherein the spring biases the cam lock hook into engagement with the latch hook.

11. The latch mechanism as claimed in claim 1, wherein the second pivot pin includes a shoulder that is received within a boss in the cam lock hook.

12. A floor latch mechanism assembly for securing a seat to the floor of a vehicle, the assembly comprising:
    a striker pin being secured to the floor of the vehicle;
    a mounting bracket having a first surface and a second surface, one of said surfaces having at least one mounting hole for receiving a fastener that is in contact with the seat;
    a latch rotateably connected to the mounting bracket;
    a means for fastening the latch to the mounting bracket;
    a hook member including a first arm, a second arm, and a portion that is operable to engage the striker pin;
    a spring for biasing the hook member; and
    a means for fastening the hook member to the mounting bracket.

13. The floor latch mechanism assembly as claimed in claim 12, wherein the mounting bracket includes a pair of holes with embosses for receiving the means for fastening.

14. The floor latch mechanism assembly as claimed in claim 12, wherein the mounting bracket includes a tab offset from the side flange to create a clearance area that prevents disengagement, the latch and hook member are aligned to move within the clearance area.

15. The floor latch mechanism assembly as claimed in claim 12, wherein the latch includes an aperture, a recess and a portion for receiving a striker pin.

16. The floor latch mechanism assembly as claimed in claim 12, wherein the latch and the hook are locked together in a first position, and are operable to disengage in a second position so as to allow the seat to move.

17. A floor latch mechanism assembly for securing a seat to the floor of a vehicle, the assembly comprising:
    a seat with a bottom side;
    at least one mounting bracket secured to said bottom side of the seat;
    a first rotating member secured to the mounting bracket, the rotating member having a notch along its periphery and an opening for receiving a striker pin;
    at least one fastener extending through the first rotating member and the mounting bracket;
    a second rotating member secured to the mounting bracket, said second rotating member being connectable to a release cable, the second rotating member having a mandrel for engaging the notch of the first rotating member;
    at least one spring for biasing the first and second rotating members in a locked position; and
    a pivot pin extending through the spring, second rotating member and the mounting bracket.

18. The floor latch mechanism assembly as claimed in claim 17, wherein the mounting bracket includes an integral guide that is offset a distance from a surface of the bracket so as to provide a clearance for the first rotating member to move within.

19. The floor latch mechanism assembly as claimed in claim 17, wherein the second rotating member has a hook at a lower end for engaging a striker pin.

20. The floor latch mechanism assembly as claimed in claim 17, wherein the pivot pin includes a reduced portion and an extended portion that is deformable against the mounting bracket.

21. A latch mechanism assembly for securing an object to another object, the assembly comprising:
- a mounting bracket having an upper member and a side member, the upper member being mountable to an object;
- a latch hook pivotally connected to the mounting bracket;
- a first pivot member extending though the latch hook and the mounting bracket;
- a hook member, the hook member and the latch hook form a lock;
- a second pivot member extending through the hook member and the mounting bracket; and
- a spring positioned for biasing the latch hook.

22. The latch assembly as claimed in claim 21, further comprising an anti-separation device offset a distance from the mounting bracket, said device maintains the latch hook and hook member in engagement with one another.

23. The latch assembly as claimed in claim 21, wherein the hook member has a hole with a centerpoint, and a curved hook portion having a centerpoint, the centerpoints being offset from one another.

24. The latch assembly as claimed in claim 21, wherein the mounting bracket has a hole with an emboss, the latch hook has a hole with an emboss, the embosses engage one another.

25. The latch assembly as claimed in claim 21, wherein the latch hook has a hole with an emboss, the mounting bracket has a hole with an emboss, the embosses cooperate to form a fit connection.

26. The latch assembly as claimed in claim 21, wherein the hook member includes a means for receiving an actuating device.

27. A latch mechanism assembly for securing an object to another object, the assembly comprising:
- a mounting bracket having a first flat member and a second flat member, the first flat member being mountable to an object;
- a latch hook pivotally connected to one of the flat members;
- a first pivot member extending through the latch hook and one of the flat members;
- a hook member pivotally mounted to one of the flat members, the hook member and the latch hook form a lock;
- a second pivot member extending through the hook member and the mounting bracket; and a spring positioned for biasing the latch hook.

* * * * *